US 12,101,680 B2

United States Patent
Culiac et al.

(10) Patent No.: US 12,101,680 B2
(45) Date of Patent: Sep. 24, 2024

(54) CONSTRAINED USER DEVICE LOCATION USING BUILDING TOPOLOGY

(71) Applicant: T-Mobile USA, Inc., Bellevue, WA (US)

(72) Inventors: Doru Culiac, Bellevue, WA (US); Narciso Faustino, McKinney, TX (US); Kevin Hinson, Seattle, WA (US); Jie Hui, Mercer Island, WA (US); Antoine Tran, Bellevue, WA (US); Bryan Yang, Seattle, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 148 days.

(21) Appl. No.: 17/225,937

(22) Filed: Apr. 8, 2021

(65) Prior Publication Data

US 2021/0329407 A1    Oct. 21, 2021

Related U.S. Application Data

(60) Provisional application No. 63/012,602, filed on Apr. 20, 2020.

(51) Int. Cl.
*H04W 4/021* (2018.01)
*H04W 4/029* (2018.01)

(52) U.S. Cl.
CPC ........... *H04W 4/021* (2013.01); *H04W 4/029* (2018.02)

(58) Field of Classification Search
CPC ....... H04W 4/029; H04W 4/021; H04W 4/33; H04W 84/18; H04W 92/18; H04W 4/02;
(Continued)

(56) References Cited

U.S. PATENT DOCUMENTS

| 8,526,368 B2 | 9/2013 | Finlow-Bates et al. |
| 8,559,975 B2 | 10/2013 | Lin et al. |

(Continued)

FOREIGN PATENT DOCUMENTS

| CA | 3065721 C | 8/2022 |
| EP | 1115262 A1 | 7/2001 |
| GB | 2574602 A | 12/2019 |

OTHER PUBLICATIONS

Jang et al. (Indoor Positioning Technologies Without Offline Fingerprinting Map: A Survey; IEEE Communications Surveys and Tutorials, vol. 21, No. 1, First Quarter 2019) (Year: 2019).*

(Continued)

*Primary Examiner* — Nizar N Sivji
*Assistant Examiner* — Jing Gao

(57) ABSTRACT

Techniques are described for locating user devices in an indoor environment based at least on a building topology model. The techniques include detecting a presence of a user device in a building. The building may include ingress and egress points connecting defined spaces within the building. The locations of the individual ingress and egress points are identified based at least on the movement data of the user device. A building topology model may be generated using the locations of the individual ingress and egress points. To locate the user device at a given timestamp, one or more of the ingress and egress points passed through by the user device may be identified. The location of the user device may be determined based at least on the locations of the one or more ingress and egress points passed through by the user device mapped to the building topology model.

20 Claims, 5 Drawing Sheets

(58) Field of Classification Search

CPC ....... H04W 4/024; H04W 4/80; H04W 64/00; H04W 4/023; H04W 4/027; H04W 4/38; H04W 4/025; H04W 88/02; H04W 4/026; H04W 4/185; H04W 12/63; H04W 16/20; H04W 12/64; H04W 56/006; H04W 64/006; G01S 5/0252; G01S 17/89; G01S 13/89

See application file for complete search history.

(56) References Cited

U.S. PATENT DOCUMENTS

| | | | |
|---|---|---|---|
| 9,301,100 | B1 | 3/2016 | Jampani et al. |
| 10,176,718 | B1* | 1/2019 | Mazuir ................. G08G 1/205 |
| 11,069,082 | B1* | 7/2021 | Ebrahimi Afrouzi ... G06T 7/521 |
| 2008/0281839 | A1 | 11/2008 | Bevan et al. |
| 2012/0072110 | A1 | 3/2012 | Venkatraman |
| 2012/0136623 | A1 | 5/2012 | Edge et al. |
| 2012/0149388 | A1 | 6/2012 | West et al. |
| 2012/0224770 | A1 | 9/2012 | Strassenburg-Kleciak |
| 2013/0304685 | A1* | 11/2013 | Kurata .................. G06Q 10/00 706/45 |
| 2014/0244163 | A1 | 8/2014 | Zhao et al. |
| 2014/0274151 | A1 | 9/2014 | Pattabiraman et al. |
| 2015/0043325 | A1 | 2/2015 | Tsukamoto et al. |
| 2015/0296473 | A1 | 10/2015 | Chan et al. |
| 2016/0127209 | A1 | 5/2016 | Singh et al. |
| 2016/0302050 | A1 | 10/2016 | Blando et al. |
| 2016/0345129 | A1 | 11/2016 | Lee et al. |
| 2017/0013409 | A1 | 1/2017 | Cerchio et al. |
| 2017/0234962 | A1 | 8/2017 | Yang et al. |
| 2017/0300973 | A1* | 10/2017 | Jones .................. G01C 21/206 |
| 2017/0318422 | A1 | 11/2017 | Kokkonen |
| 2017/0366943 | A1 | 12/2017 | Yoon et al. |
| 2018/0091946 | A1 | 3/2018 | Venkatraman et al. |
| 2018/0109921 | A1 | 4/2018 | Cerchio et al. |
| 2018/0180706 | A1 | 6/2018 | Li et al. |
| 2018/0375945 | A1* | 12/2018 | Bratsman .............. G06F 16/909 |
| 2019/0072390 | A1 | 3/2019 | Wang et al. |
| 2019/0182627 | A1 | 6/2019 | Thoresen et al. |
| 2019/0236732 | A1 | 8/2019 | Speasl et al. |
| 2019/0375094 | A1 | 12/2019 | Kim et al. |
| 2020/0018812 | A1 | 1/2020 | Lindquist et al. |
| 2020/0228943 | A1 | 7/2020 | Martin et al. |
| 2021/0063163 | A1 | 3/2021 | Huberman et al. |
| 2021/0279417 | A1 | 9/2021 | Delaney |

OTHER PUBLICATIONS

U.S. Appl. No. 17/192,382, Final Office Action mailed Aug. 4, 2022, 39 pages.

U.S. Appl. No. 17/074,279, Final Office Action mailed Apr. 20, 2022, 76 pages.

U.S. Appl. No. 17/074,279, Notice of Allowance mailed Jun. 21, 2022, 87 pages.

U.S. Appl. No. 17/074,279, Supplemental Notice of Allowance mailed Jul. 6, 2022, 10 pages.

U.S. Appl. No. 17/183,715, Notice of Allowance mailed May 4, 2022, 18 pages.

U.S. Appl. No. 17/183,715, Notice of Allowance mailed Jun. 13, 2022, 17 pages.

U.S. Appl. No. 17/192,382, Office Action mailed May 24, 2022, 42 pages.

U.S. Appl. No. 17/074,279, Office Action mailed Nov. 10, 2022, 97 pages.

U.S. Appl. No. 17/192,382, Office Action mailed Dec. 8, 2022, 47 pages.

U.S. Appl. No. 17/225,841, Office Action mailed Sep. 23, 2022, 73 pages.

Pradhan, et al., "(Stable) virtual landmarks: Spatial dropbox to enhance retail experience", 2014 Sixth International Conference on Communication Systems and Networks (COMSNETS), Bangalore, 2014, pp. 1-8.

Davidson, P. and R. Piche, "A Survey of Selected Indoor Positioning Methods for Smartphones," IEEE Communications Surveys & Tutorials, 2016, 24 pages. https://tutcris.tut.fi/portal/files/11073461/main_2_column.pdf.

Jang, Beakcheol and Hyunjung Kim, "Indoor Positioning Technologies Without Offline Fingerprinting Map: A Survey," IEEE Communications Surveys & Tutorials ( vol. 21,Issue: 1, Firstquarter 2019), 21 pages. https://ieeexplore.ieee.org/abstract/document/8451859.

Langlois, et al., "Indoor Localization with Smartphones: Harnessing the Sensor Suite i n Your Pocket," IEEE Consumer Electronics Magazine ( vol. 6, Issue: 4, Oct. 2017), 1 page. https://ieeexplore.ieee.org/document/8048717.

Simultaneous localization and mapping (2020), 8 pages. https://en.wikipedia.org/wiki/Simultaneous_localization_and_mapping.

Jiang, et al,. "Autonomous Robotic Monitoring of Underground Cable Systems," 12th International Conference on Advanced Robotics, Sep. 2005, pp. 673-679.

Sen, et al., "Avoiding multipath to revive inbuilding WiFi localization," ACM MobiSys 2013, 14 pages.

Laput, et al., "EMSense: Touch Recognition of Uninstrumented, Electrical and Electromechanical Objects," ACM User Interface Software and Technology Symposium, Nov. 8-11, 2015, 10 pages.

Roy, et al., "I am a smartphone and I can tell my user's walking direction", ACM MobiSys 2014, 14 pages.

Li, et al., "ID-Match: A Hybrid Computer Vision and RFID System for Recognizing Individuals in Groups," ACM Conference on Human Factors in Computing Systems (CHI), May 7-12, 2016, 12 pages.

Li et al., "IDSense: A Human Object Interaction Detection System Based on Passive UHF RFID," ACM Conference on Human Factors in Computing Systems (CHI), Apr. 18-24, 2015, 10 pages.

Shu, et al., "Last-Mile Navigation Using Smartphones," ACM MobiCom 2018, 13 pages.

Wang, et al., "No need to war-drive: unsupervised indoor localization," ACM MobiSys 2012, 14 pages.

Mariakakis , et al., "Sail: Single access point-based indoor localization," ACM MobiSys 2014, 14 pages.

Pradhan, et al., "Smartphone-based Acoustic Indoor Space Mapping," Proc. ACM Interact. Mob. Wearable Ubiquitous Technol. 2, 2, Article 75 (Jun. 2018), 26 pages.

Wang, et al., "Indoor-Outdoor Detection Using a Smart Phone Sensor," Sensors (Basel). Oct. 2016; 16(10): 1563, 24 pages. https://www.ncbi.nlm.nih.gov/pmc/articles/PMC5087352/.

U.S. Appl. No. 17/074,279, Office Action mailed Nov. 17, 2021, 80 pages.

U.S. Appl. No. 17/183,715, Office Action mailed Jan. 4, 2022, 27 pages.

U.S. Appl. No. 17/074,279, Notice of Allowance mailed Apr. 26, 2023, 113 pages.

U.S. Appl. No. 17/192,382, Notice of Allowance mailed Apr. 13, 2023, 44 pages.

U.S. Appl. No. 17/225,841, Final Office Action mailed Feb. 14, 2023, 61 pages.

U.S. Appl. No. 17/967,798, Notice of Allowance mailed Apr. 13, 2023, 27 pages.

U.S. Appl. No. 17/192,382, Notice of Allowance mailed Jul. 11, 2023, 47 pages.

U.S. Appl. No. 17/192,382, Notice of Allowance mailed May 30, 2023, 45 pages.

U.S. Appl. No. 17/225,841, Final Office Action mailed Nov. 20, 2023, 63 pages.

U.S. Appl. No. 17/225,841, Non Final Office Action mailed Jun. 22, 2023, 73 pages.

U.S. Appl. No. 17/967,798, Notice of Allowance mailed Jul. 20, 2023, 20 pages.

U.S. Appl. No. 17/225,841, Office Action mailed May 3, 2024, 63 pages.

* cited by examiner

CONSTRAINED USER DEVICE LOCATION USING BUILDING TOPOLOGY

CROSS-REFERENCE TO RELATED PATENT APPLICATION

This application claims priority to U.S. Provisional Patent Application No. 63/012,602, filed on Apr. 20, 2020, and entitled "Determining Elevation Using Building Topology Models," which is hereby incorporated by reference in its entirety.

BACKGROUND

In many indoor locations such as commercial buildings, where there is a lack of signal and/or building penetration, or in Global Positioning System (GPS)-denied areas, accurate localization of user devices is generally not feasible. As a result, the location information of a user device may be tracked in outdoor locations and then no longer monitored once the user device enters a building or other indoor environment. Another challenge of indoor localization is navigating within the complexity of indoor environments and detailed interior building structures of various buildings. For instance, while multiple buildings may appear similar in structure from the exterior, the buildings may greatly differ in floorplans and layouts. Thus, accessing one point such as an entrance of one building may be different from accessing another entrance of a different building even if the two entrances may be situated similarly on the two buildings from the outside.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
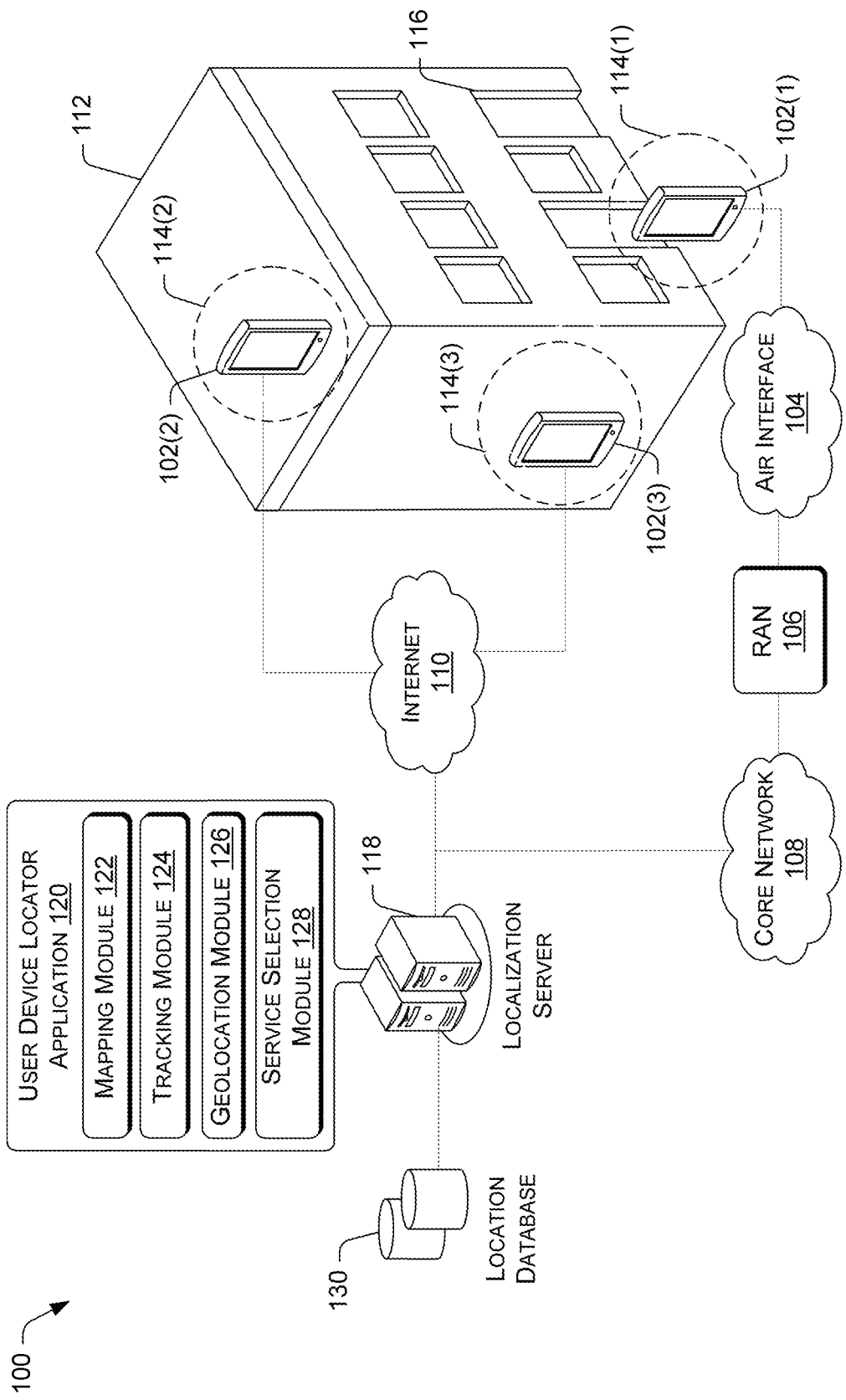
FIG. 1 illustrates an example of a network architecture for determining a user device location in an indoor environment based at least on a building topology model.

This disclosure is directed to techniques for locating user devices using a building topology based on collective movement data of user devices. In various embodiments, the building topology may be a three-dimensional (3D) representation of a building or other indoor environment provided via a 3D coordinate system (e.g., on an XYZ plane) by leveraging one or more building geometries that are generated based at least on the location of ingress and egress points of the building. In one example, the location of an ingress and egress point may be depicted as a point with 3D coordinates (i.e., XYZ coordinates). One or more building geometries of the building may be combined to produce the building topology model. In some examples, building blueprints or floor plans may be provided from an open source to provide a 3D representation of the building. The building blueprints may include vector coordinates of a building plan, elevation, and/or section where the individual vector coordinates may be associated with a magnitude, direction, an initial node, a terminal node, and corresponding GPS locations. The locations of the ingress and egress points may be mapped to the building topology model to determine a spatial relationship among various building features such as elevator landing doors, entrances, exits, and/or so forth.

The building topology model represents the building as a collection of defined spaces that are connected via ingress and egress points. To transition into and/or between the defined spaces, a user device may pass through one of the ingress and egress points in the building. At the ground level, this can help determine indoor/outdoor transitions, for example, when the user device transitions through a garage entrance or a door. Above ground level, this can help determine floor transitions, for example, when the user device transitions floors via an elevator, escalator, staircase, or stairwell. Locations of the ingress and egress points may be identified using movement data that is associated with the user device. In some aspects, the movement data may include motion and orientation events detected using the user device's built-in sensors. One or more sensor data may be leveraged to detect events that indicate transitions from one defined space to another defined space. For example, one or more sensors of the user device may detect a change in elevation, which may indicate floor transitions.

Because the user devices transition through one or more ingress and egress points within the building, movement of the user devices with respect to the ingress and egress points may constrain device location to a defined space. Accordingly, identifying the locations of the user devices based at least on the movement data that indicate the user device's movement with respect to ingress and egress point can particularly improve the likelihood of current floor/elevation identification. In some aspects the user device's location may be identified as a point with 3D coordinates that may be mapped to the building topology model. The location of the user device may be utilized to provide various network service offerings and/or recommendations for nearby accommodations.

The techniques described herein may be implemented in a number of ways. Example implementations are provided below with reference to the following figures.

Example Network Architecture

FIG. 1 illustrates an example of a network architecture for locating a user device in an indoor environment based at least on a building topology model. The network 100 includes one or more user devices 102(1)-102(3). The user devices 102(1)-102(3) may be smartphones, mobile devices, personal digital assistants (PDAs), or other electronic devices having a wireless communication function, that are capable of receiving input, processing the input, and generating output data.

The user devices 102(1)-102(3) are configured to communicate with a telecommunication network via an access network over a physical communications interface or layer, shown in FIG. 1 as air interfaces 104 and/or a direct-wired connection. The air interface 104 can comply with a given cellular communications protocol (e.g., CDMA, EVDO, eHRPD, GSM, EDGE, W-CDMA, LTE, etc.). In other embodiments, an additional air interface can comply with a wireless Internet Protocol (e.g., Wi-Fi, IEEE 802.11). The access network may comprise a RAN 106 which includes a plurality of access points that serve user devices over air interfaces, such as the air interface 104. The access points in the RAN 106 can be referred to as access nodes (ANs), access points (APs), and base stations (BSs, Node Bs, eNode Bs, gNb, etc.). These access points can be terrestrial access points (or ground stations), or satellite access points.

The RAN 106 is configured to connect to a core network 108 that can perform a variety of functions and support one or more communication services, including bridging circuit-switched (CS) calls between user devices served by the RAN 106 and other user devices served by a different RAN, and can also mediate an exchange of packet-switched (PS) data with external networks such as Internet 110. The Internet 110 includes a number of routing agents and processing agents (not shown). In FIG. 1, the user device 102(3) is shown as connecting to the Internet 110 directly (i.e., separate from the core network 108, such as over an Ethernet connection of a Wi-Fi or an 802.11-based network). The Internet 110 can thereby function to bridge packet-switched data communications among the user device 102(1)-102(3) via the core network 108.

The user devices 102(1)-102(3) may operate in a variety of environments. For instance, the user device 102(1) may be operated while moving from an outdoor environment to an indoor environment such as a building 112. It is noted that while the user devices 102(1)-102(3) in FIG. 1 may depict a smartphone, the user devices may also be a laptop or other computing devices with a direct wired connection to the Internet 110, such as a direct connection to a modem or router (e.g., for a Wi-Fi router with both wired and wireless connectivity).

The building 112 may be a commercial or residential property with multiple defined spaces 114(1)-114(3) that may be connected via one or more ingress and egress points. Generally, defined spaces may include floors, sections, hallways, rooms, and/or other areas of the building 112 that may be defined by a physical border. However, defined spaces may also include other three-dimensional spaces that may be characterized by non-physical boundaries such as a part of a room (e.g., the perimeter around furniture, buffer adjacent to a room, etc.). In FIG. 1, the individual user devices 102(1)-102(3) are located within the respective defined spaces 114(1)-114(3). For instance, the user device 102(1) is located in the first defined space 114(1) that may be connected to another defined space via an entrance/exit 116.

Figure 2:
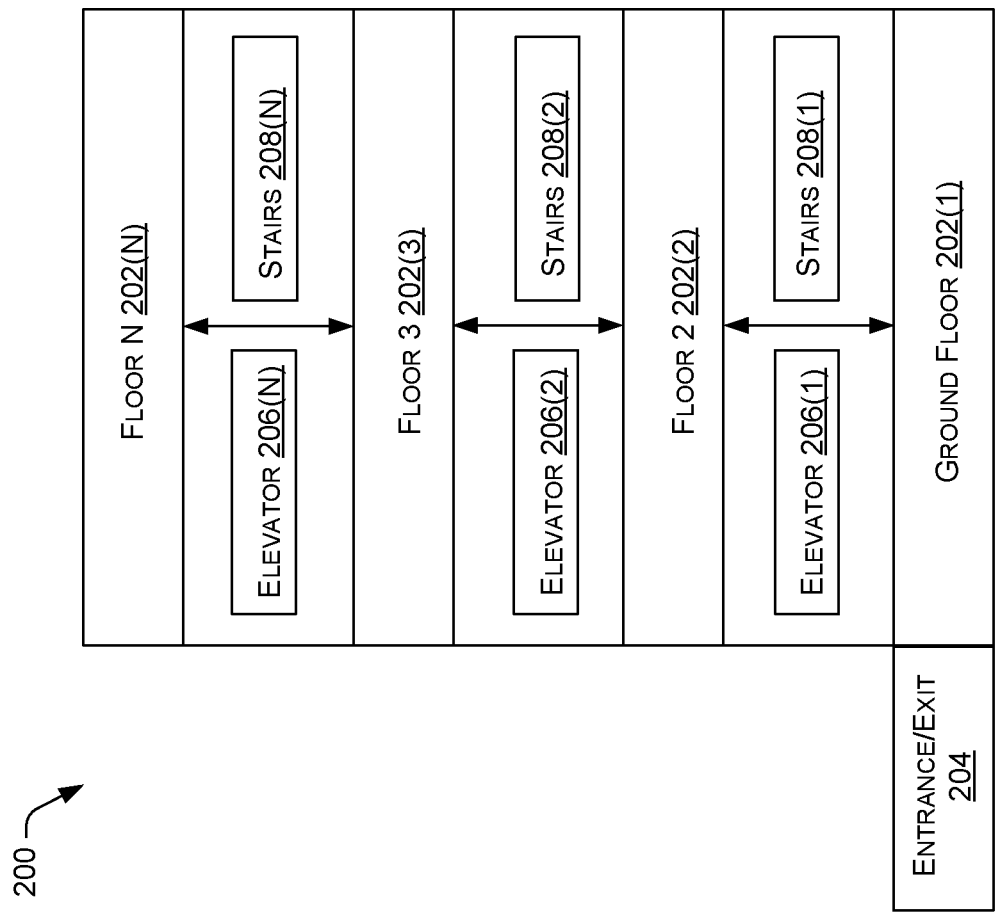
FIG. 2 is a view of an exemplary building topology model of an indoor environment.

A representative building topology model of the building 112 is shown in FIG. 2. In FIG. 2, the building topology model 200 of the building includes multiple floors 202(1)-202(N). The individual floors 202(1)-202(N) may comprise a defined space. The individual floors 202(1)-202(N) may be connected via one or more ingress and egress points. In the illustrated embodiment, the ingress and egress points may include elevator landing doors 206(1)-206(N) and entrances to stairwell 208(1)-208(N). The ingress and egress points may also include an entrance/exit 204.

The user devices 102(1)-102(3) may travel from one location in the building to another location in the building. Generally, to transition into and/or between the spaces, the user devices may pass through one of the ingress and egress points in the building. For example, the user devices may move between floors 202(1)-202(N). As the user devices move between floors 202(1)-202(N), the user devices may indicate an elevation change. Accordingly, a change in a user device's elevation may indicate that the user device passed through one or more of the ingress and egress points such as elevator landing doors 206(1)-206(N).

Turning back to FIG. 1, the location server 118 is configured to support indoor geolocation functions to locate the user devices 102(1)-102(3) in the building 112. The location server 118 may include a user device locator application 120. The user device locator application 120 may be executable via one or more hardware, software, or communication environments, each of which enables the location server 118 to determine the location of the user devices 102(1)-102(3) when the user devices 102(1)-102(3) are in the building 112. In some aspects, the location server 118 may locate the user devices 102(1)-102(3) based at least on a building topology model that is associated with the building 112.

The user device locator application 120 may include one or more modules such as a mapping module 122, a tracking module 124, a geolocation module 126, and a service selection module 128. In some aspects, the mapping module 122 may receive movement data that is associated with the individual user devices 102(1)-102(3). The movement data may include timestamped motion and orientation events from user devices' 102(1)-102(3) built-in sensors (e.g., accelerometer, gyroscope, barometer, compass, etc.) that indicate transitions from one defined space to another defined space, such as floor transitions. In one example, a motion and orientation event may indicate a change in elevation of a user device at a given timestamp. Transitions from one defined space to another defined space may be associated with passing through one or more ingress and egress points. Accordingly, the mapping module 122 may determine that a user device passed through an ingress and egress point at the given time stamp to move between floors. Additionally, the mapping module 122 may identify the defined spaces in the building 112 connected by the ingress and egress points passed through by the user device based on the movement data of the user devices. In some aspects, the mapping module 122 may be configured to identify the location of the ingress and egress points within the building 112 using a 3D coordinate system such as a 3D Cartesian coordinate system. Accordingly, the location of the ingress and egress points may correspond to 3D coordinates.

In some examples, a beacon may be deployed at the individual location of the ingress and egress points. Additionally, the ingress and egress points may be located near one or more access points such as a router, which can communicate with the beacon and/or one or more user devices 102(1)-102(3) that communicate with a network. The mapping module 122 may implement various techniques such as a trilateration method to determine the locations of the ingress and egress points by deploying probing devices that can measure signals from the beacons. In such a scenario, the 3D position of the ingress and egress points may be calculated. The calculated 3D position of the ingress and egress points may be correlated with known GPS locations of probing devices, GPS locations of the vector coordinates of the building plan, elevation, or section. For example, a GPS location or position may include a longitude coordinate, a latitude coordinate, and an elevation above sea level. The locations of the ingress and egress points may be stored in a location database 130.

In various embodiments, one or more Near-Field Communication (NFC) devices may be positioned at or near ingress and egress points to communicate with passing user devices 102(1)-102(3) and authorize users' access to different parts of the building 112. Accordingly, these ingress and egress points may physically restrict a user from passing through unless the user's credentials are authenticated and the user is verified as authorized personnel via the user device. Additionally, or alternatively, the user devices 102(1)-102(3) may be equipped with an NFC identification device to report identification of the ingress and egress points while accessing different (i.e., restricted) parts of the building 112. The NFC devices positioned within the building 112 and the locations of the NFC devices may be stored in the location database.

The mapping module 122 may also access building plans, blueprints, or floor plans of the building 112 from the location database 130. The location database 130 can comprise a data management layer that includes software utilities for facilitating the acquisition, processing, storing, reporting, and analysis of data from multiple data sources. In one example, the data sources can include a platform for open-source projects or a repository that provides building information and data, and/or so forth. The location database 130 may be a part of a distributed storage system, in which data may be stored for long periods and replicated to guarantee reliability.

Based at least on the locations of the ingress and egress points derived from the movement data, the mapping module 122 may generate a building topology model that identifies the locations of the ingress and egress points. In some embodiments, the mapping module 122 may also utilize building data (e.g., building plans, blueprints, floor plans, etc.) from the location database 130 to generate the building topology model. The building topology model may be generated on a floor-by-floor or section-by-section basis. For instance, the mapping module 122 may generate a building topology model that corresponds to the ground floor of the building 112 upon locating the ingress and egress points that are located on the ground floor of the building 112.

In some aspects, the tracking module 124 may be configured to manage the movement data that is associated with the individual user devices 102(1)-102(3) to track the location of the user devices 102(1)-102(3) over a period of time. Accordingly, the tracking module 124 may identify a movement pattern associated with the individual user devices 102(1)-102(3). In some aspects, the movement data may be anonymized such that the movement data is not associated with personally identifiable information of the users of the user devices 102(1)-102(3). For instance, the movement data may be aggregated to generate a collective movement data. The movement data may be stored in the location database 130.

The geolocation module 126 may be configured to identify the defined space in which a user device is located in response to a request to locate a user device in the building 112. In one example, the geolocation module 126 may identify one or more ingress and egress points passed through by the user device based at least on the movement data of the user device at a given timestamp. The geolocation module 126 may locate the ingress and egress points based at least on the building topology model to determine the location of the user device relative to the ingress and egress points at the given timestamp. For instance, if an ingress and egress point is located on the ground floor of the building 112, the geolocation module 126 may determine that the user device is also located on the ground floor. In some aspects, the geolocation module 126 may be unable to locate the ingress and egress points passed through by the user device at a given timestamp. In this regard, the geolocation module 126 may predict the location of the user device based at least on the identified a movement pattern. For instance, the geolocation module 126 may predict that the user device is located in an underground garage of an office building at the end of a business day during a work week if the user device passed through a garage entrance earlier in the same day.

In some examples, the geolocation module 126 may calculate the distance between the user device and a beacon that is located at one or more ingress and egress points using signal measurements from the beacon and/or other data such as sensor data. For instance, the approximate position of the user device may be determined based on signal strength triangulation based on received signal measurements of the beacon, trigonometry-based location calculation based on the known positions of the beacon, and/or so forth. In response to determining the location of the user device, the mapping module 122 may determine the 3D coordinates of the user device and map the approximate location of the user device in the building 112 based at least on the building topology model.

In some aspects, the geolocation module 126 may be configured to transmit the location of the user devices 102(1)-102(3) in response to a triggering event. For example, the user devices 102(1)-102(3) may receive input from a user indicating a state of emergency. In other examples, the user devices 102(1)-102(3) may receive emergency and government alerts or public safety notifications. In response to the triggering event, the geolocation module 126 may transmit the location of the user device to first responders, emergency services, and/or authorities. The geolocation module 126 may also transmit the location of the user devices 102(1)-102(3) to an additional device that is associated with an emergency contact in an address book that is stored in or accessible via the user devices 102(1)-102(3).

The service selection module 128 may be configured to provide recommendations for nearby amenities and products based at least on the location of the user devices 102(1)-102(3). For example, the service selection module 128 may provide recommendations for nearby restaurants and shops that are located within the building 112. The service selection module 128 may filter recommendations by type of amenities and products offered by various businesses. Additionally, the service selection module 128 may filter recommendations by proximity and other parameters and preferences as set by the users of the user devices 102(1)-102(3). The recommendations may be displayed on the user devices 102(1)-102(3) via a mobile application such as a navigation application, a retail application, and/or other types of applications that may provide a notification function. In some aspects, the service selection module 128 may implement a navigation application to route the user devices 102(1)-102(3) from a starting position to the desired destination.

Example Computing Device Components

Figure 3:
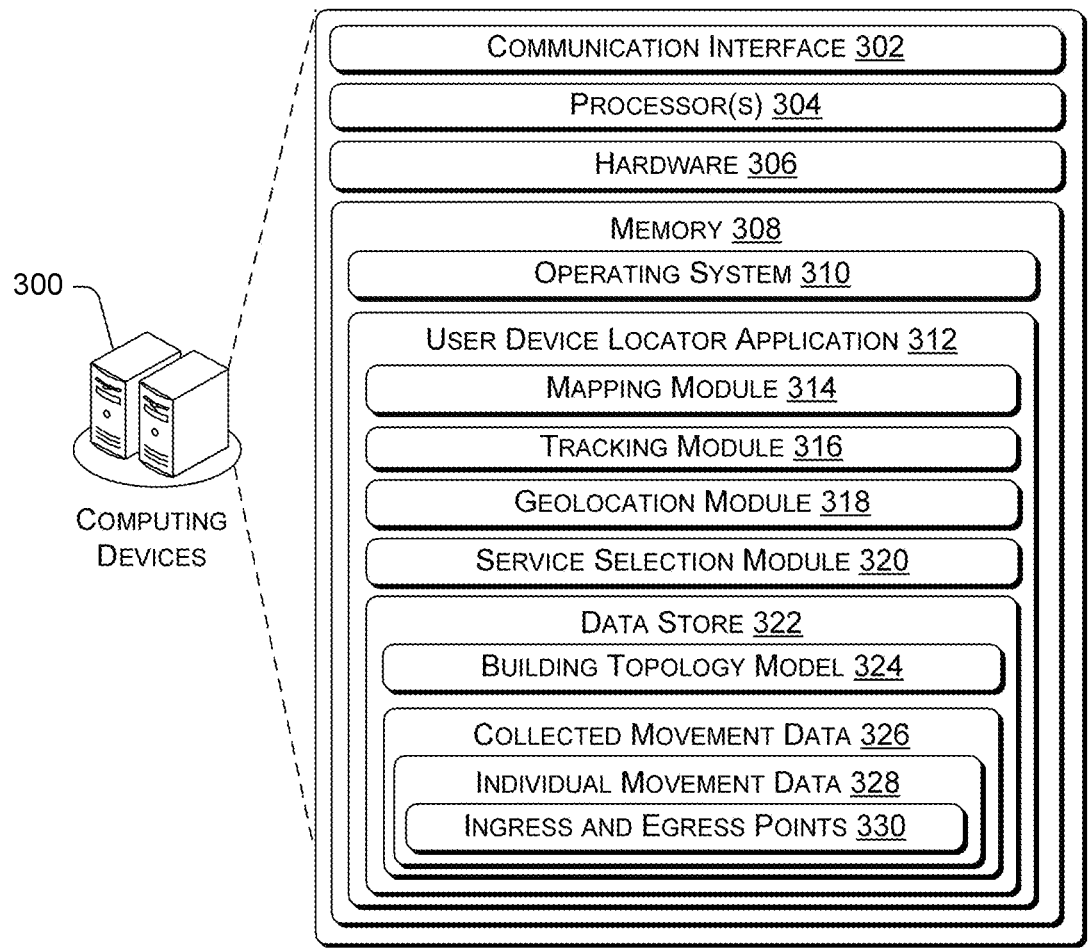
FIG. 3 is a block diagram showing various components of an illustrative computing device that locates user devices using a building topology based on collective movement data of user devices.

FIG. 3 is a block diagram showing various components of illustrative computing devices 300, wherein the computing devices can comprise a location server. It is noted that the computing devices 300 as described herein can operate with more or fewer of the components shown herein. Additionally, the computing devices 300 as shown herein or portions thereof can serve as a representation of one or more of the computing devices of the present system.

The computing devices 300 may include a communication interface 302, one or more processors 304, hardware 306, and memory 308. The communication interface 302 may include wireless and/or wired communication components that enable the computing devices 300 to transmit data to and receive data from other networked devices. In at least one example, one or more processor(s) 304 may be a central processing unit(s) (CPU), graphics processing unit(s) (GPU), both a CPU and GPU, or any other sort of processing unit(s). Each of the one or more processor(s) 304 may have numerous arithmetic logic units (ALUs) that perform arithmetic and logical operations as well as one or more control units (CUs) that extract instructions and store content from processor cache memory, and then execute these instructions by calling on the ALUs, as necessary during program execution.

The one or more processor(s) 304 may also be responsible for executing all computer applications stored in the memory, which can be associated with common types of volatile (RAM) and/or nonvolatile (ROM) memory. The hardware 306 may include an additional user interface, data communication, or data storage hardware. For example, the user interfaces may include a data output device (e.g., visual display, audio speakers), and one or more data input devices. The data input devices may include but are not limited to, combinations of one or more keypads, keyboards, mouse devices, touch screens that accept gestures, microphones, voice or speech recognition devices, and any other suitable devices.

The memory 308 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 308 may also include a firewall. In some embodiments, the firewall may be implemented as hardware 306 in the computing devices 300.

The processor(s) 304 and the memory 308 of the computing devices 300 may implement an operating system 310 and a user device locator application 312. The operating system 310 may include components that enable the computing devices 300 to receive and transmit data via various interfaces (e.g., user controls, communication interface, and/or memory input/output devices), as well as process data using the processor(s) 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The user device locator application 312 may include routines, program instructions, objects, and/or data structures that perform particular tasks or implement particular abstract data types. For example, the user device locator application 312 may include one or more instructions which, when executed by the one or more processors 304, direct the computing devices 300 to perform operations related to locate a user device in an indoor environment such as a building based at least on a building topology model that is associated with the building. In some aspects, the user device locator application 312 includes one or more modules such as a mapping module 314, a tracking module 316, a geolocation module 318, and a service selection module 320.

The mapping module 314 may include one or more instructions, which, when executed by one or more processors 304, direct the computing devices 300 to perform operations related to identifying and mapping ingress and egress points within the building. In some aspects, the mapping module 122 may identify and locate the ingress and egress points 330 based at least on individual movement data 328 that is associated with a user device. The movement data may include timestamped motion and orientation events that indicate a user device moving through ingress and egress points to transition from one defined space to another defined space. In some examples, the mapping module may render a 3D representation of a building using a 3D coordinate system (e.g., 3D Cartesian coordinate system). Accordingly, the mapping module 122 may locate the ingress and egress points via points corresponding to 3D coordinates. The individual movement data 328 may be aggregated to determine a collective movement data 326. In one aspect, multiple occurrences of at least one of the ingress and egress points may be consolidated. For example, multiple user devices may be passing through the same ingress and egress points if the distance between a first ingress and egress point and a second ingress and egress point is within a predetermined threshold distance.

Based at least on the location of the ingress and egress points, the mapping module 314 may generate a building topology model that is associated with the building. In one example, the mapping module 314 may connect the points with 3D coordinates that correspond to the locations of the ingress and egress points. The points may be connected from different angles to generate 2D surface geometries or 3D geometries from different perspectives of the building. The building topology model 318 may be a combination of one or more 2D or 3D building geometries.

Additionally, the mapping module 314 may identify certain features of the building based on at least 3D coordinates corresponding to the ingress and egress points. For instance, the mapping module 314 may determine that a first ingress and egress point located at $(X_1, Y_1, Z_1)$ and a second IoT device located at $(X_2, Y_2, Z_2)$ may be elevator landing doors connected via an elevator shaft if $X_1=X_2$ and $Z_1=Z_2$. Further, the distance between $Y_1$ and $Y_2$ may be substantially equal to the distance between adjacent floors or distance between each floor stops via an elevator. In some aspects, the mapping module 314 may also access building blueprints, floor plans, and/or other building data that is associated with the building from a database. The mapping module 314 may reference the building data to generate the building topology model and to derive any supplemental information such as confirmed locations of the identified ingress and egress points detected based at least on the movement data.

The tracking module 316 may include one or more instructions, which, when executed by the one or more processors 304, direct the computing devices 300 to perform operations related to tracking the location of user devices within a building and log the user device location history based at least on the movement data 328. The location history of the user device may be used to detect a movement pattern of the user device. In some aspects, the tracking module 316 may generate collective movement data based at least on a set of movement data from multiple user devices. In some aspects, the movement data may be anonymized such that the movement data is not associated with personally identifiable information of a user of a user device.

The geolocation module 318 may include one or more instructions, which, when executed by one or more processors 304, direct the computing devices 300 to perform operations related to identify the location of a user device in the building. The geolocation module 318 may receive a request to locate the user device in the building. In response to the request, the geolocation module 318 may identify one or more of the ingress and egress points passed through by the user device based at least on the movement data at a given timestamp. Accordingly, the geolocation module 318 may determine the location of the user device based at least on the locations of the one or more ingress and egress points passed through by the user device mapped to the building topology model. In some aspects, the mapping module 314 may be configured to map a point with 3D coordinates that correspond to the identified location of the user device.

The service selection module 320 may include one or more instructions, which, when executed by the one or more processors 304, direct the computing devices 300 to perform operations related to providing recommendations for nearby amenities and products based at least on the location of the user device. The service selection module 320 may obtain building information such as a building directory from a database and provide recommendations for nearby restaurants and shops that are located within the building. For example, the database may include building directory information that is maintained by the communication network and/or building directory information that is retrieved from third-party data sources. In some aspects, the recommendations may be displayed on the user device via a mobile or a web application such as a navigation application, a retail application, and/or other types of applications that may provide a user interface for displaying notifications and alerts. In some aspects, the service selection module 320 may implement a navigation application to route the user device from a starting position to a desired destination within the building. For example, the service selection module 320 may direct a user of the user device to an emergency exit and service kiosks.

Example Processes

Figure 4:
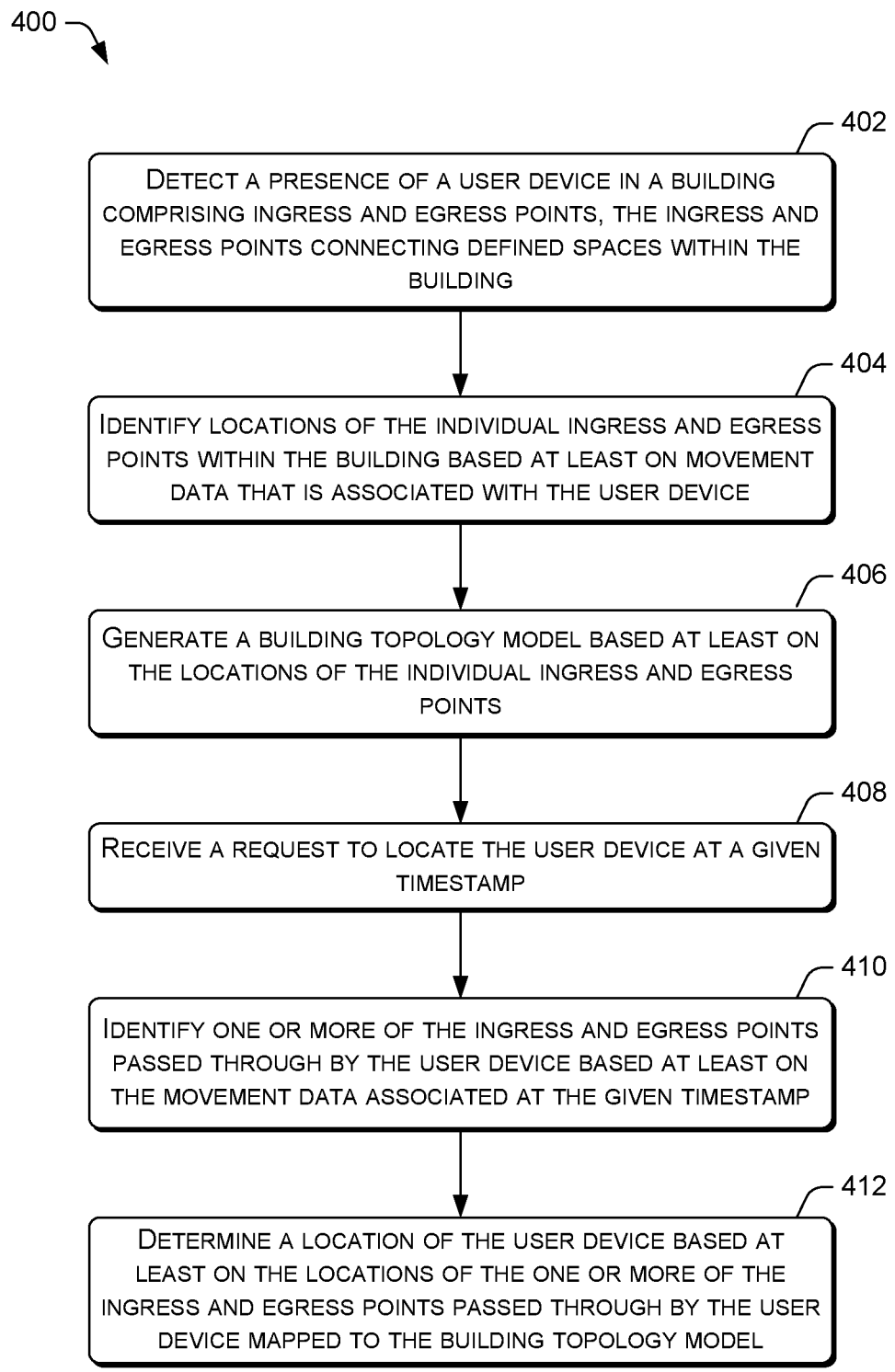
FIG. 4 is a flow diagram of an example process for performing indoor geolocation-based at least on a building topology model.
Figure 5:
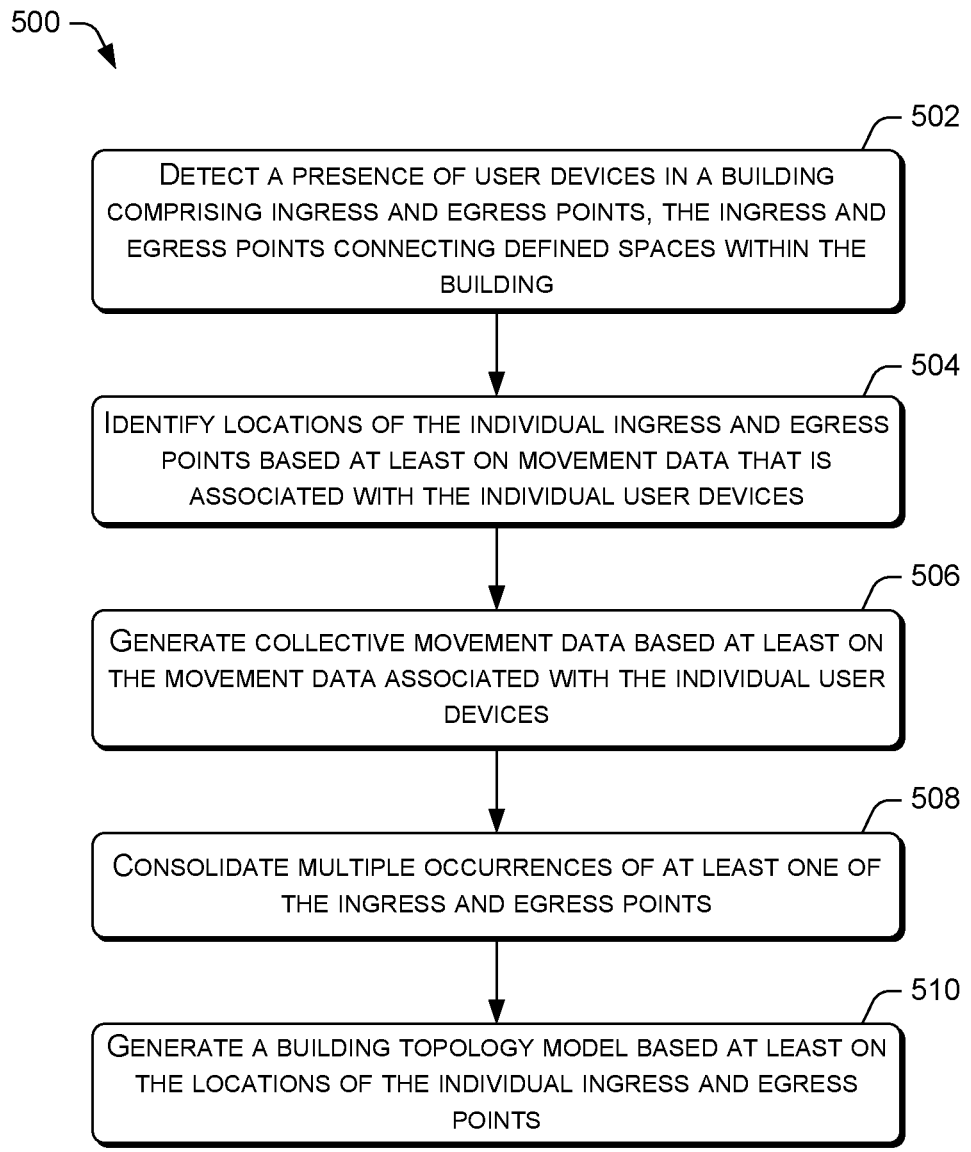
FIG. 5 is a flow diagram of an example process for defining spaces in a building topology model of an indoor environment based on collective movement data of user devices.

FIGS. 4-5 present illustrative processes 400 and 500 for indoor geolocation. The processes 400 and 500 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, processes 400 and 500 are described with references to FIGS. 1 through 3.

FIG. 4 is a flow diagram of an example process for performing indoor geolocation-based at least on a building topology model. At block 402, a mapping module of a location server may detect a presence of a user device in a building comprising ingress and egress points, the ingress and egress points connecting defined spaces in the building. In various embodiments, the mapping module may determine that the user device is located inside the building based at least on the user device's measured signals (e.g., Received Signal Strength Indicator (RSSI), Reference Signal Received Power (RSRP), Time of Arrival (ToA), Angle of Arrival (AoA), Angle of Departure (AoD), etc.) from other devices or other signal sources such as access points in the building.

At block 404, the mapping module may identify locations of the individual ingress and egress points within the building based at least on movement data that is associated with the user device. The movement data may indicate motion and orientation events from user devices' built-in sensors (e.g., accelerometer, gyroscope, barometer, compass, etc.) that indicate transitions from one defined space to another defined space, such as floor transitions, indoor/outdoor transitions, and/or so forth. The movement data may enable a tracking module of the location server to track the location of the user device.

At block 406, the mapping module may generate a building topology model based at least on the locations of the individual ingress and egress points. The building topology model may be a 3D representation of the building. Accordingly, the ingress and egress points may correspond to 3D coordinates that can be mapped to the building topology model. At block 408, a geolocation module of the server may receive a request to locate the user device at a given timestamp. The request may include identifying information that is associated with the user device such as a user device identifier (e.g., MSISDN, ICCID, IMSI, IMEI, etc.).

At block 410, the geolocation module may identify one or more of the ingress and egress points passed through by the user device based at least on the movement data at the given timestamp. In some aspects, the ingress and egress points may be associated with a building feature such as an elevator, an entrance/exit, and/or so forth. At block 412, the geolocation module may determine the location of the user device based at least on the locations of the one or more ingress and egress points passed through by the user device mapped to the building topology model. In some aspects, the location of the user device may be mapped to the building topology model relative to the ingress and egress points.

FIG. 5 is a flow diagram of an example process for defining spaces in a building topology model of an indoor environment based on collective movement data of user devices. At block 502, a mapping module of a location server may detect a presence of a user device in a building comprising ingress and egress points, the ingress and egress points connecting defined spaces within the building. In various embodiments, the mapping module may determine that the user device is located inside the building based at least on the user device's measured signals.

At block 504, the mapping module may identify the locations of the individual ingress and egress points based at least on movement data that is associated with the individual user devices. The ingress and egress points may correspond to 3D coordinates that can be mapped to the building topology model. Additionally, the ingress and egress points may be associated with a building feature such as an elevator, an entrance/exit, and/or other features that may be shown in building blueprints, floor plans, and/or other so forth. At block 506, a tracking module of the location server may generate collective movement data based at least on the movement data associated with the individual user devices.

At block 508, the tracking module may consolidate multiple occurrences of at least one of the ingress and egress points from the collective movement data. For example, multiple user devices may be passing through the same ingress and egress points if the distance between a first ingress and egress point and a second ingress and egress point is within a predetermined threshold distance. At block 510, the mapping module may generate a building topology model based at least on the locations of the individual ingress and egress points identified in the collective movement data.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
    detecting movement of a user device in a building through a first ingress/egress and a second ingress/egress of the building, the first ingress/egress and the second ingress/egress respectively permitting one or both of ingress to and egress from a respective defined space within the building;
    logging a first user device location history based at least on the detected movement;
    identifying locations of the first ingress/egress and the second ingress/egress from movement data of the detected movement of the user device relative to the first ingress/egress and the second ingress/egress, wherein the first ingress/egress and the second ingress/egress are located in parallel horizontal X-Y planes, respectively, and at a vertical Z coordinate on a Z-axis perpendicular to the horizontal X-Y planes, the Z-axes are collinear or parallel to each other, and the Z coordinates of the first ingress/egress and the second ingress/egress are different;
    determining X, Y, and Z coordinates of the first ingress/egress and the second ingress/egress;
    leveraging one or more building geometries and the identified locations of the first ingress/egress and the second ingress/egress to generate a building topology model, wherein the building topology model is a three-dimensional (3D) representation of the building;
    receiving a request to locate the user device;
    identifying the first ingress/egress and the second ingress/egress passed through by the user device based at least on the movement data at a given timestamp and the building topology model;
    mapping to the building topology model the locations of the identified first ingress/egress and second ingress/egress passed through by the user device;
    determining a spatial relationship between the first ingress/egress and the second ingress/egress that indicates an elevation change for the user device based on a difference in their Z coordinates; and
    determining a current location of the user device based at least on the mapped locations of the first ingress/egress and the second ingress/egress on the building topology model, the elevation change, and the movement data.

2. The one or more non-transitory computer-readable media of claim 1, wherein the acts further comprise:
    receiving additional movement data that is associated with additional user devices passing through the first ingress/egress and the second ingress/egress;
    logging a second user device location history based at least on the received additional movement data; and
    generating collective movement data comprising the movement data and the additional movement data, indicating the passing of both the user device and the additional user devices through the first ingress/egress and the second ingress/egress;
    wherein determining the current location of the user device is based at least on the indicating in the collective movement data.

3. The one or more non-transitory computer-readable media of claim 2, wherein the acts further comprise:
    identifying an additional ingress/egress based at least on the additional movement data; and
    generating a new building topology model based at least on the additional ingress/egress.

4. The one or more non-transitory computer-readable media of claim 1, wherein the movement data comprise timestamped motion and orientation events from the user device.

5. The one or more non-transitory computer-readable media of claim 4, wherein the timestamped motion and orientation events indicate the user device transitioning from a first floor of the building to a second floor of the building.

6. The one or more non-transitory computer-readable media of claim 1, wherein the acts further comprise:
    associating the first ingress/egress and the second ingress/egress with a building feature.

7. The one or more non-transitory computer-readable media of claim 1, wherein the acts further comprise:
    identifying a first movement pattern in the detected movement based at least on the logged first user device location history; and
    predicting the location of the user device based at least on the identified first movement pattern.

8. A computer-implemented method, comprising:
    detecting movement of a user device in a building through a first ingress/egress and a second ingress/egress of the building, the first ingress/egress and the second ingress/egress respectively permitting one or both of ingress to and egress from a respective defined space within the building;
    logging a first user device location history based at least on the detected movement;
    identifying locations of the first ingress/egress and the second ingress/egress from movement data of the detected movement of the user device relative to the first ingress/egress and the second ingress/egress, wherein the first ingress/egress and the second ingress/egress are located in parallel horizontal X-Y planes, respectively, and at a vertical Z coordinate on a Z-axis perpendicular to the horizontal X-Y planes, the Z-axes are collinear or parallel to each other, and the Z coordinates of the first ingress/egress and the second ingress/egress are different;
    determining X, Y, and Z coordinates of the first ingress/egress and the second ingress/egress;

leveraging one or more building geometries and the identified locations of the first ingress/egress and the second ingress/egress to generate a building topology model, wherein the building topology model is a three-dimensional (3D) representation of the building;
receiving a request to locate the user device;
identifying the first ingress/egress and the second ingress/egress passed through by the user device based at least on the movement data at a given timestamp and the building topology model;
mapping to the building topology model the locations of the identified first ingress/egress and second ingress/egress passed through by the user device;
determining a spatial relationship between the first ingress/egress and the second ingress/egress that indicates an elevation change for the user device based on a difference in their Z coordinates; and
determining a current location of the user device based at least on the mapped locations of the first ingress/egress and the second ingress/egress on the building topology model, the elevation change, and the movement data.

9. The computer-implemented method of claim 8, further comprising:
receiving additional movement data that is associated with additional user devices passing through the first ingress/egress and the second ingress/egress;
logging a second user device location history based at least on the received additional movement data; and
generating collective movement data comprising the movement data and the additional movement data, indicating the passing of both the user device and the additional user devices through the first ingress/egress and the second ingress/egress;
wherein determining the current location of the user device is based at least on the indicating in the collective movement data.

10. The computer-implemented method of claim 9, further comprising:
identifying an additional ingress/egress based at least on the additional movement data; and
generating a new building topology model based at least on the additional ingress/egress.

11. The computer-implemented method of claim 8, wherein the movement data comprise timestamped motion and orientation events from the user device.

12. The computer-implemented method of claim 11, wherein the timestamped motion and orientation events indicate the user device transitioning from a floor of the building to a second defined space floor of the building.

13. The computer-implemented method of claim 10, further comprising:
identifying a building feature that corresponds to the first ingress/egress and the second ingress/egress based at least on the locations of the first ingress/egress and the second ingress/egress.

14. The computer-implemented method of claim 8, further comprising:
identifying a first movement pattern in the detected movement based at least on the logged first user device location history; and
predicting the location of the user device based at least on the identified first movement pattern.

15. A system, comprising:
one or more non-transitory storage mediums configured to provide stored computer-readable instructions, the one or more non-transitory storage mediums coupled to one or more processors, the one or more processors configured to execute the computer-readable instructions to cause the one or more processors to:
detect movement of a user device in a building through a first ingress/egress and a second ingress/egress of the building, the first ingress/egress and the second ingress/egress respectively permitting one or both of ingress to and egress from a respective defined space within the building;
log a first user device location history based at least on the detected movement;
identify locations of the first ingress/egress and the second ingress/egress from movement data of the detected movement of the user device relative to the first ingress/egress and the second ingress/egress, wherein the first ingress/egress and the second ingress/egress are located in parallel horizontal X-Y planes, respectively, and at a vertical Z coordinate on a Z-axis perpendicular to the horizontal X-Y planes, the Z-axes are collinear or parallel to each other, and the Z coordinates of the first ingress/egress and the second ingress/egress are different;
determine X, Y, and Z coordinates of the first ingress/egress and the second ingress/egress;
leverage one or more building geometries and the identified locations of the first ingress/egress and the second ingress/egress to generate a building topology model, wherein the building topology model is a three-dimensional (3D) representation of the building;
receive a request to locate the user device;
identify the first ingress/egress and the second ingress/egress passed through by the user device based at least on the movement data at a given timestamp and the building topology model;
map to the building topology model the locations of the identified first ingress/egress and second ingress/egress passed through by the user device;
determine a spatial relationship between the first ingress/egress and the second ingress/egress that indicates an elevation change for the user device based on a difference in their Z coordinates; and
determine a current location of the user device based at least on the mapped locations of the first ingress/egress and the second ingress/egress on the building topology model, the elevation change, and the movement data.

16. The system of claim 15, wherein the one or more processors are further configured to:
receive additional movement data that is associated with additional user devices passing through the first ingress/egress and the second ingress/egress;
log a second user device location history based at least on the received additional movement data; and
generate collective movement data comprising the movement data and the additional movement data, indicating the passing of both the user device and the additional user devices through the first ingress/egress and the second ingress/egress;
wherein determining the current location of the user device is based at least on the indicating in the collective movement data.

17. The system of claim 15, wherein the one or more processors are further configured to:
identify an additional ingress/egress based at least on the additional movement data; and
generate a new building topology model based at least on the additional ingress/egress.

18. The system of claim 15, wherein the movement data comprise motion and orientation events indicating the user device transitioning between defined spaces within the building.

19. The system of claim 15, wherein the one or more processors are configured to:
   detect a signal from a beacon located at one of the first ingress/egress and second ingress/egress;
   identify a location of the beacon, wherein the location of the beacon corresponds to the location of the one of the first ingress/egress and second ingress/egress.

20. The system of claim 15, wherein the one or more processors are configured to:
   recommend a service based at least on the current location of the user device.

* * * * *